(12) United States Patent
Upadhyaya et al.

(10) Patent No.: US 10,366,350 B2
(45) Date of Patent: Jul. 30, 2019

(54) ENTERPRISE COMPENSATION APPLICATION SUPPORTING A LARGE NUMBER OF EMPLOYEES

(75) Inventors: Anadi Upadhyaya, Hyderabad (IN); Ty Vernon Hayden, Grand Junction, CO (US); Michele Chung, San Jose, CA (US); Krishnaraj Mahadevan, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1700 days.

(21) Appl. No.: 13/095,931

(22) Filed: Apr. 28, 2011

(65) Prior Publication Data
US 2012/0278212 A1   Nov. 1, 2012

(51) Int. Cl.
*G06F 15/02* (2006.01)
*G06Q 10/00* (2012.01)
*G06Q 40/00* (2012.01)

(52) U.S. Cl.
CPC ............. *G06Q 10/00* (2013.01); *G06Q 40/00* (2013.01)

(58) Field of Classification Search
CPC ....... G06Q 40/06; G06Q 40/12; G02B 15/173
USPC .............................................. 705/14, 26, 16
See application file for complete search history.

(56) References Cited

U.S. PATENT DOCUMENTS

| | | | |
|---|---|---|---|
| 5,649,182 A | 7/1997 | Reitz | |
| 6,055,511 A * | 4/2000 | Luebbering | .... G06Q 10/063118 235/376 |
| 6,119,097 A | 9/2000 | Ibarra | |
| 7,082,569 B2 | 7/2006 | Voshell | |
| 7,229,223 B2 | 6/2007 | Nomura | |
| 7,370,047 B2 | 5/2008 | Gorman | |
| 7,555,387 B2 * | 6/2009 | Sladky | ............... G01C 21/3679 700/200 |
| 2002/0035506 A1 * | 3/2002 | Loya | ...................... G06Q 10/06 705/14.19 |
| 2004/0049732 A1 | 3/2004 | Wicks | |
| 2006/0101013 A1 | 5/2006 | Kenney et al. | |

(Continued)

OTHER PUBLICATIONS

Alex Jose, "Custom View in MS Excel", blog posted on Sep. 12, 2007, 1-3 pages, available at http://tricks4pc.blogspot.com/2007/09/custom-views-in-ms-excel.html.

(Continued)

*Primary Examiner* — Rokib Masud
(74) *Attorney, Agent, or Firm* — IPHorizons PLLC; Narendra Reddy Thappeta (57) ABSTRACT

An enterprise compensation application enables different users to create corresponding sets of custom filters of interest, and then stores in a non-volatile storage, data indicating the corresponding custom filters created by each user. In response to receiving a request from a user for information related to a set of employees, the application identifies the set of custom filter created by the user (by examining the stored data), presents information related to the requested set of employees and also makes available the identified set of custom filters. On receiving an input indicating that the user has selected a custom filter from the set, the application determines a subset of employee as limited by the selected custom filter and then presents the information related to the subset to the user. Thus, the enterprise compensation application simplifies/supports compensation management for a large number of employees.

20 Claims, 9 Drawing Sheets

(56) References Cited

U.S. PATENT DOCUMENTS

| | | | | |
|---|---|---|---|---|
| 2006/0229890 | A1 | 10/2006 | Sattler et al. | |
| 2006/0293940 | A1* | 12/2006 | Tsyganskiy | G06F 8/72 705/7.29 |
| 2007/0260513 | A1* | 11/2007 | Pavlov | G06Q 10/06 705/14.39 |
| 2007/0266054 | A1 | 11/2007 | Stephens et al. | |

OTHER PUBLICATIONS

"Compensation Management and Performance Strategies Made Easy eCompensation", Halogen Software Inc., downloaded Circa, Jul. 4, 2011, 1-3 pages, available at http://www.halogensoftware.com/products/ecompensation-pay-for-performance.

"CompWatch® Workers' Comp Claims Management System", Benefit Software Inc., downloaded circa Jun. 9, 2011, 1 page, available at http://www.bsiweb.com/mainsite/compwatch_overview.html.

"Documentation/How Tos/Using Data Ranges, Data Sort and Data Filters", Openoffice.org Wiki, downloaded circa, Jul. 4, 2011, pp. 1-5, available at http://wiki.services.openoffice.org/wiki/Documentation/How_Tos/Defining_a_Data_Range.

Edward Cutrell, "Fast, flexible filtering with phlat", CHI '06 Proceedings Personal Information Management, ACM, Apr. 22-27, 2006, pp. 261-270, ISBN:1-59593-372-7.

"Excel Advanced Filter Introduction", Contextures Inc., downloaded circa Jun. 6, 2011, 1-5 pages, available at http://www.contextures.com/xladvfilter01.html.

Jethro, "Back to Basics : Data Filters in Excel 2003 and Excel 2007", Spy Journal 3.0, Jun. 19, 2008, 1-5 pages, available at http://www.spyjournal.biz/data_filters_in_Excel_2003_and_2007.html.

Linda Johnson, "Applying Data Filters in Excel", MouseTrax computing solution, Downloaded circa Jun. 9, 2011, 1-3 pages, available at http://pubs.logicalexpressions.com/pub0009/LPMArticle.asp?ID=60.

"Quadrant Payroll", QHR Software Inc., downloaded circa Jul. 4, 2011, 1-2 pages, available at http://www.qhrsoftware.com/Quadrant-Payroll.html.

"Quadrant Enterprise Management Solution", QHR Software Inc., downloaded circa Jul. 4, 2011, 1-2 pages, available at http://www.qhrsoftware.com/Quadrant-Enterprise-Management-Solutions.html.

"Excel Advanced Filter Complex Criteria", Contextures Inc., downloaded circa Jul. 4, 2011, 1-2 pages, available at http://www.contextures.com/xladvfilter02.html.

* cited by examiner

Browser - Workforce Compensation

01 Annual Compensation Plan 2010 ← 410

| View Performance Rating | Promote Workers | Allocate Compensation | Approve Worksheet |

Currency [Worker Local Currency ▼]  [Save] [Cancel]

[Generate Communication Letters]

▼ Summary ← 430

| Component | Eligible workers | No of Workers Compensated | Total Eligible Salary | Allocated | Overall Budget | Availabel Budget |
|---|---|---|---|---|---|---|
| ▲ Salary - Merit | 16 | 0 | 938,000.00 | 0.00 | 0.00 | 0.00 |
| ▲ Bonus | 16 | 0 | 938,000.00 | 0.00 | 50,490.00 | 50,490.00 |

▼ Worksheet ← 440

Action ▶ View ▶ Format ▶

[Name ▼] ← 445    [Eligibility ▼]    [Job Title ▼]    [Team ▼]    [Advanced] ← 450    455 460 465
                                                                                    ✎  X Clear All

| Name | Alerts | Job Title | New Job Title | Current Annual Salary | Current Base Salary | New Base Salary | Merit Eligible Salary | Merit Amount | Merit Percentage |
|---|---|---|---|---|---|---|---|---|---|
| Ragu, Viswanath | ○ | 10720.Applicat.. |  | 50,000.00 | 50,000.00 | 55,000.00 | 50,000.00 | 5,000.00 | 10.0 |
| Akask, Ram | △ | 10750.Applicat.. | 10030 Software▶ | 75,000.00 | 75,000.00 | 78,500.00 | 75,000.00 | 3,500.00 | 5.0 |
| Rohit, Sharma | ○ | 10020.Softwar.. |  | 48,000.00 | 48,000.00 | 50,000.00 | 48,000.00 | 2,000.00 | 4.8 |
| Dinesh, Karthik | ○ | 10740.Applicat.. |  | 62,000.00 | 62,000.00 | 64,250.00 | 62,000.00 | 2,250.00 | 4.5 |

Row Selected : 1    Columns Hidden : 11 ← 468

Browser - Workforce Compensation

01 Annual Compensation Plan 2010 ← 410

Currency [Worker Local Currency ▼]   (Save) (Cancel)

| View Performance Rating | Promote Workers | Allocate Compensation | Approve Worksheet | Generate Communication Letters |

▼ Summary

Workers Promoted

| | Workers | Percentage |
|---|---|---|
| Not Promoted | 16 | 100% |
| Promoted | 0 | 0.00 |

↙ 470

▼ Worksheet

Action ▼  View ▼  Format ▼

Name [▲] [Eligibility ▼]   [▲] [Job Title ▼]   [▲] [Worksheet Manager ▼]   [▲] [Organization ▼]   [▲] [Team ▼]   [▲] [Advanced ▼] ◇ X Clear All

↑ 478

| Name | Country | Eligibility Status | Alert | Worksheet Manager | Organization | Location | Job | Years in Job | Grade | Years in Grade |
|---|---|---|---|---|---|---|---|---|---|---|
| Ragu, Viswanath | US | Eligible | ○ | Chouhan Ravi | Vision Corporat | Hyderabad - Ind | 10720.Applicat. | 9.3 | IC2 | 9.3 |
| Akask, Ram | US | Eligible | △ | Singh, Rakesh | Vision Corporat | Chennai- India | 10750.Applicat. | 9.3 | IC3 | 9.3 |
| Rohit, Sharma | US | Eligible | ○ | Tadoori, Namitha | Vision Corporat | Hyderabad - Ind | 10020.Softwar. | 9.4 | IC5 | 9.4 |

Row Selected : 1   Columns Hidden : 11

← 420

↖ 475

Browser - Workforce Compensation

01 Annual Compensation Plan 2010

Currency [Worker Local Currency ▼]  (Save) (Cancel) — 420

| View Performance Rating | Promote Workers | Allocate Compensation | Approve Worksheet | Generate Communication Letters |

Summary — 430

| Component | Eligible workers | No of Workers Compensated | Total Eligible Salary | Allocated | Overall Budget | Availabel Budget |
|---|---|---|---|---|---|---|
| ▼ Salary - Merit | 16 | 16 | 1,005,597.00 | 46,417.00 | 60,335.00 | 13917.91 |

Worker Populat | Allocation Stat | Salary Stat | Workers on Tgt | Pay for Perform | Alert Summary

Alert Summary — 480

| | Description | No. of Workers | Filter |
|---|---|---|---|
| ○ | Bonus Exceeds Maximum recommended amount | 5 | ▲ |
| | Worker has less than 6 months of service | 1 | ▲ |
| △ | Workers current salary is outside salary range | 3 | ▲ |
| | Worker was or is on extended leave of absence | 0 | |
| | Worker has been terminated | 0 | |

— 485

| ▲ Bonus | | 16 | 12 | 1,005,597.00 | | 31,230.00 | | 50,279.85 | | 19,049.85 |

▼ Worksheet — 440

Action ▼  View ▼  Format ▼

| Name | [▼] | ▲ Eligibility [ ▼ ] | Job Title | ▲ Job Title [ ▼ ] | New Job Title | ▲ Team [ ▼ ] | Current Annual Salary | Current Base Salary | ▲ Advanced [ ] | New Base Salary | Merit Eligible Salary | Merit Amount | ◇ ✗ Clear All Merit Percentage |
|---|---|---|---|---|---|---|---|---|---|---|---|---|---|
| Name | Alerts | | Job Title | | New Job Title | | Current Annual Salary | Current Base Salary | | New Base Salary | Merit Eligible Salary | Merit Amount | Merit Percentage |
| Ragu, Viswanath | ○ | | 10720.Applicat... | [ ▼ ] | | | 50,000.00 | 50,000.00 | | 55,000.00 | 50,000.00 | 5,000.00 | 10.0 |
| Akask, Ram | △ | | 10750.Applicat... | | 10030 Software... | | 75,000.00 | 75,000.00 | | 78,500.00 | 75,000.00 | 3,500.00 | 5.0 |

Row Selected : 1     Columns Hidden : 11

ENTERPRISE COMPENSATION APPLICATION SUPPORTING A LARGE NUMBER OF EMPLOYEES

BACKGROUND OF THE INVENTION

1. Technical Field

The present disclosure relates to Internet technologies based systems for human resources management, and more specifically to an enterprise compensation application supporting a large number of employees.

2. Related Art

Compensation refers to remuneration offered to employees for the services rendered for the benefit of the employer. Compensation includes salary typically in the form of certain payment per month (week or year). Compensation can also include other forms of remuneration such as bonuses, awards, promotions (to a higher responsibility), and paid holidays, etc.

Compensation applications are often deployed in enterprises to enable higher level employees (usually referred to as managers) to view and change the compensation of various employees (at lower level in the organization hierarchy).

As the number of employees such a higher level employee is responsible for increases, the complexity of compensation management also increases. It is therefore generally desirable that enterprise compensation applications simplify compensation management for a large number of employees.

BRIEF DESCRIPTION OF THE DRAWINGS

Example embodiments of the present invention will be described with reference to the accompanying drawings briefly described below.

FIGS. 4A-4C together depicts the manner in which employee information is presented to users/managers in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention facilitates management of compensation for a large number of employees by users of an enterprise compensation application. In one embodiment, the enterprise compensation application enables different users to create corresponding sets of custom filters of interest, and then stores in a non-volatile storage, data indicating the corresponding set of custom filters created by each user.

In response to receiving a request from a user for information related to a set of employees, the enterprise compensation application identifies the set of custom filters created by the user (by examining the data in the non-volatile storage), presents information related to the requested set of employees and also makes available the identified set of custom filters. On receiving an input indicating that the user has selected a custom filter from the set, enterprise compensation application determines a subset of employee as limited (for example, based on a condition specified) by the selected custom filter and then presents the information related to the subset of employees to the user.

Each user/manager is accordingly facilitated to create the desired/appropriate custom filters and to apply them when rewarding (allocating compensation to) the employees. Thus, the enterprise compensation application simplifies compensation management for a large number of employees.

According to another aspect of the present invention, information is presented in the form of different tabs, with the set of employees presented in a second tab determined based on whether a custom filter is selected in a first tab. Thus, on receiving an indication that the user has navigated to (i.e., wishes to view the information in) the second tab, a second set of employees is presented if the indication is received before a custom filter is selected by the user (in the first tab) and a subset of the second set as limited by the selected custom filter, is presented otherwise (i.e., if the custom filter is selected prior to navigation to the second tab).

According to one more aspect of the present invention, the enterprise compensation application facilitates a user/manager to clear/remove a selected custom filter across all the tabs. Accordingly, in response to the user/manger navigating to the different tabs, the information related to the original set of employees (without applying of any custom filters) is displayed in each of the tabs. Thus, a user/manger is relieved of the burden of repeatedly re-applying and/or clearing the desired custom filters when accessing employee information in the different tabs.

According to yet another aspect of the present invention, information related to the employees is presented in the form of a table with multiple columns, and hiding of any of the columns results in the enterprise compensation application not including any of the custom filters containing the hidden column in the set of filters made available to the user. Thus, a user/manager is provided only the custom filters that are relevant to the columns currently being viewed by the user/manager.

According to another aspect of the present invention, summary information indicating the number of employees matching each of the custom filters (created by a user) is also presented to the user (along with the employee information). The user/manager is accordingly enabled to select the desired custom filter (to limit the set of employees) based on the summary information.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
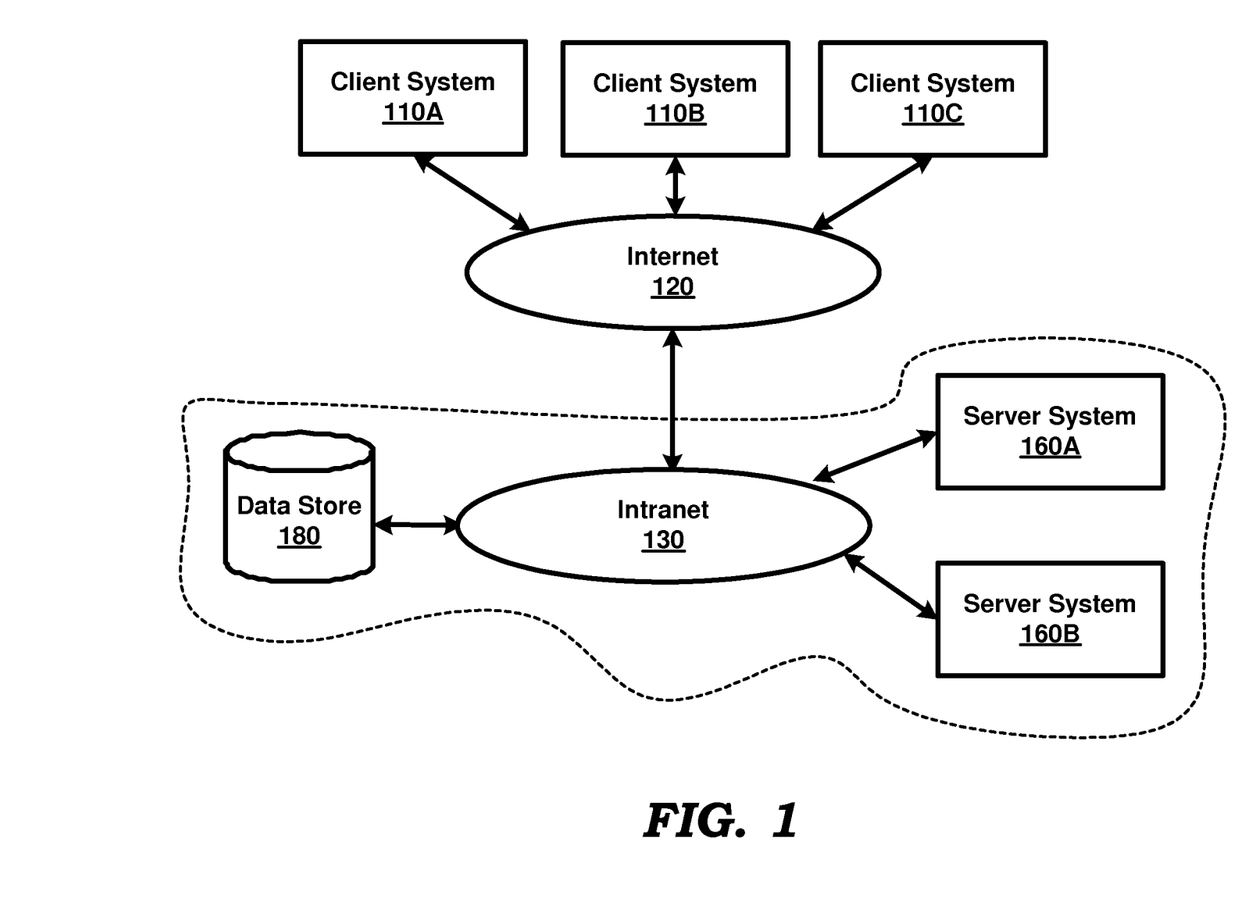
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110C, Internet 120, intranet 130, server systems 160A-160B, and data store 180.

Merely for illustration, only representative number/type of systems is shown in FIG. 1. Many environments often contain many more systems, both in number and type, depending on the purpose for which the environment is designed. Each system/device of FIG. 1 is described below in further detail.

Intranet 130 represents a network providing connectivity between server systems 160A-160B, developer system 160, and data store 180 all provided within an enterprise (as indicated by the dotted boundary). Internet 120 extends the connectivity of these (and other systems of the enterprise) with external systems such as client systems 110A-110C.

Each of intranet 130 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 130. When the packet contains content such as port numbers, which specifies the target application, the packet may be said to be directed to such application as well.

Each of client systems 110A-110C represents a system such as a personal computer, workstation, mobile station, etc., used by end users to generate (user) requests directed to business/enterprise applications executing in server systems 160A-160B. The requests may be generated using appropriate user interfaces. In general, a client system requests an application for performing desired tasks and receives corresponding responses containing the results of performance of the requested tasks. Each request is sent in the form of an IP packet directed to the desired server system, with the IP packet including data identifying the desired tasks in the payload portion.

Data store 180 represents a non-volatile (persistent) storage facilitating storage and retrieval of a collection of data by business/enterprise applications executing in server systems 160A-160B. Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of server systems 160A-160B represents a server, such as a web/application server, executing business/enterprise applications capable of performing tasks requested by users using one of client systems 110A-110C. A server system may perform the tasks on data maintained internally or on external data (e.g., stored in data store 180) and then send the result of performance of the tasks to the requesting client system. One such business application may be an enterprise compensation application that enables higher level employees/managers (by sending appropriate requests using client systems 110A-110C) to view and change the compensation of various employees of a business entity/enterprise.

As noted in the Background section, the complexity of compensation management increases as the number of employees a manager is responsible for increases. Several aspects of the present invention facilitate an enterprise compensation application (assumed to be executing in server system 160A) to simplify compensation management for a large number of employees, as described below with examples.

3. Simplifying Compensation Management for a Large Number of Employees

Figure 2:
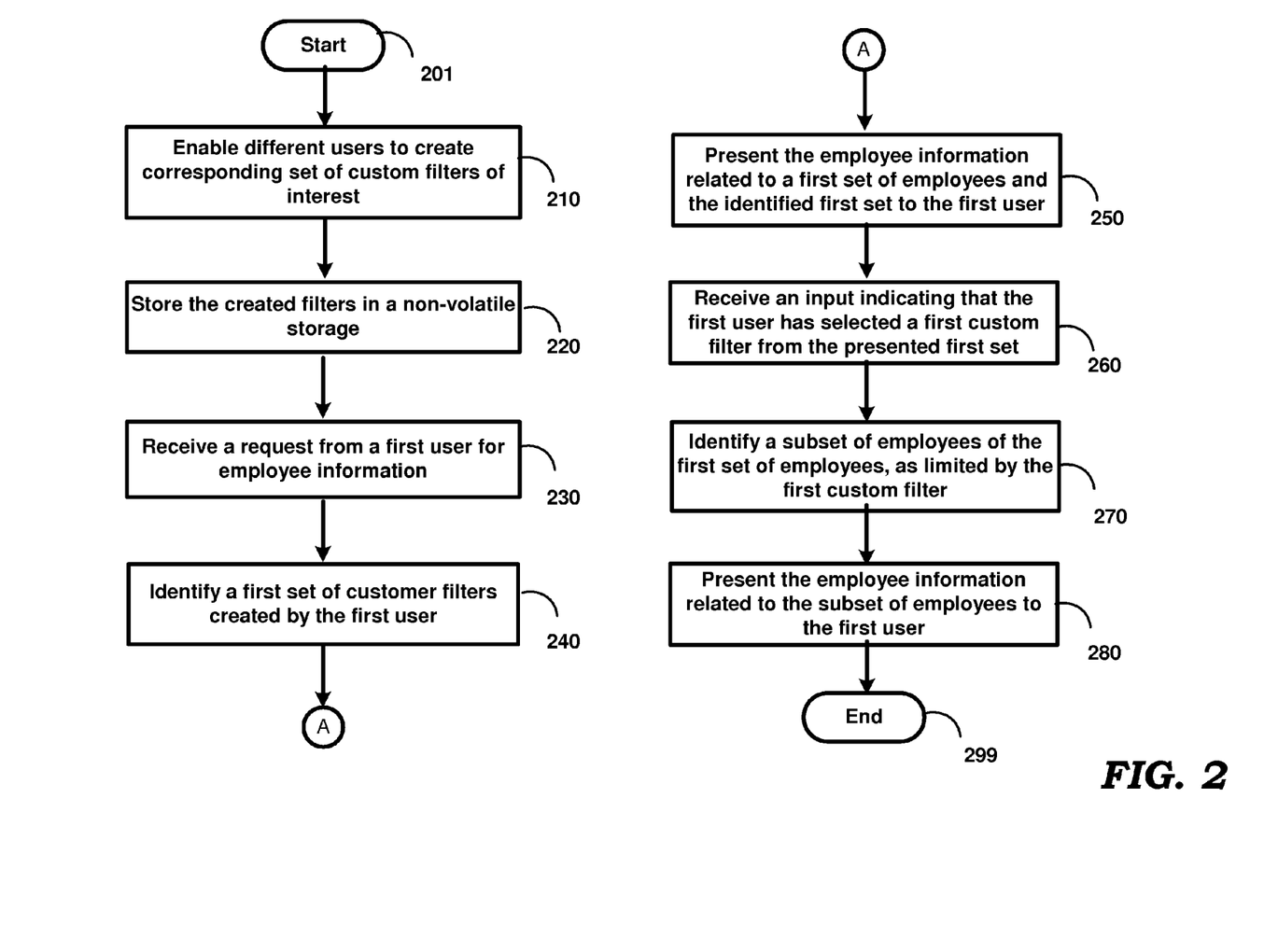
FIG. 2 is a flow chart illustrating the manner in which compensation management for a large number of employees is simplified according to an aspect of the present invention.

FIG. 2 is a flow chart illustrating the manner in which compensation management for a large number of employees is simplified according to an aspect of the present invention. The flowchart is described with respect to server systems 160A of FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, server system 160A enables different users/managers to create corresponding set of custom filters of interest. A custom filter implies that the user creating the filter specifies his own desired criteria that eventually control the filtering/selection of different data of interest. It should thus be appreciated a manager A may create a different set of custom filters compared to another manager B, depending on her specific role/responsibility/philosophy, etc. In contrast, a generic filter (e.g., defined by an administrator or inbuilt into the enterprise compensation application when shipped by a vendor to the enterprise) would be commonly available to all users. The custom filters may be created by sending appropriate requests from one of client systems 110A-110C.

In step 220, server system 160A stores the created filters in a non-volatile storage. The filters are stored associated with the corresponding users, who created the respective filter. Thus, assuming manager A created a first filter, data is maintained indicating that manager A created that filter. Such data indicating the filters and the corresponding users may be stored in data store 180.

In step 230, server system 160A receives a request from a first user/manager for employee information. The employee information may include the compensation information (e.g., current salary, previous bonuses paid, etc.), personal information (e.g., name, age, current work location, years of service, current title, etc.) and performance information (quantum of work delivered, hours worked, etc.). The request may be sent by the first users using one of client systems 110A-110C.

In step 240, server system 160A identifies a first set of customer filters created by the first user/manager. Thus, the data stored in the non-volatile storage may be inspected (after being retrieved into faster memories such as random access memory (RAM)) to compare the identity of the first user with the user information stored in step 220. The specific filters identified as being created by the first user may thus be identified.

In step 250, server system 160A presents the employee information related to a first set of employees and (makes available) the identified first set of custom filters to the first user. The requested employee information is typically displayed in the form of web pages with a convenient navigation. The identified set of customer filters may also be made available for use by the user, according to a convenient user interface. It may be appreciated that only small portions of the total presented information may be displayed for the user at a given time instance. Thus, the presented information represents all the information made available to the user for display or other types of access (e.g., export to a file).

It may be appreciated that the employee information may also be maintained in data store 180. Server systems 160A may accordingly retrieve the information from data store 180 and process the retrieved information (for example, formatting the data into web pages) before presenting the information to the first user. Alternatively, the custom filters and the employee information may be maintained in different data stores, for example, the custom filters as part of a file and the employee information in a database server.

In step 260, server system 160A receives an indication that the first user has selected a first custom filter from the presented first set of custom filters. Each custom filter may have an associated identifier (e.g., unique name or number) and such unique identifier may be received from the first user. The unique name may be specified by the user/manager when creating the custom filter.

In step 270, server system 160A determines a subset of employees of the first set of employees, as limited by the first custom filter. In other words, the first custom filter is applied against the previously presented data (of step 250) so that a smaller matching set is determined as the subset. It may be readily appreciated that applying different custom filters may cause selection of corresponding different subsets of employees (with some overlapping between the subsets), even assuming the same base/original set of employees.

In step 280, server system 160A presents the employee information related to the subset of employees to the first user. The presentation may be as in step 250, for example, in the form of web pages. It should be appreciated that some of the steps described above may be performed outside of server system 160A. For example, the determination of step 270 and presentation of step 280 may be performed in a client system (where the information is displayed to the user) locally. The flowchart ends in step 299.

Thus, different users/managers are enabled to create and apply different sets of custom filters based on their individual responsibilities, philosophies, etc., to limit the employees viewed at a particular instance. The managers may change compensation for only the viewed employees at that particular instance. Accordingly, the compensation management of a large number of employees is simplified.

The manner in which the steps of FIG. 2 may be provided by an enterprise compensation application is described below with examples. In particular, the user interfaces provided by the enterprise compensation application for enabling a manager to create desired custom filters is first described, followed by the usage of such custom filters for limiting the employee information presented to the manager.

4. Creating Custom Filters

Figure 3A:
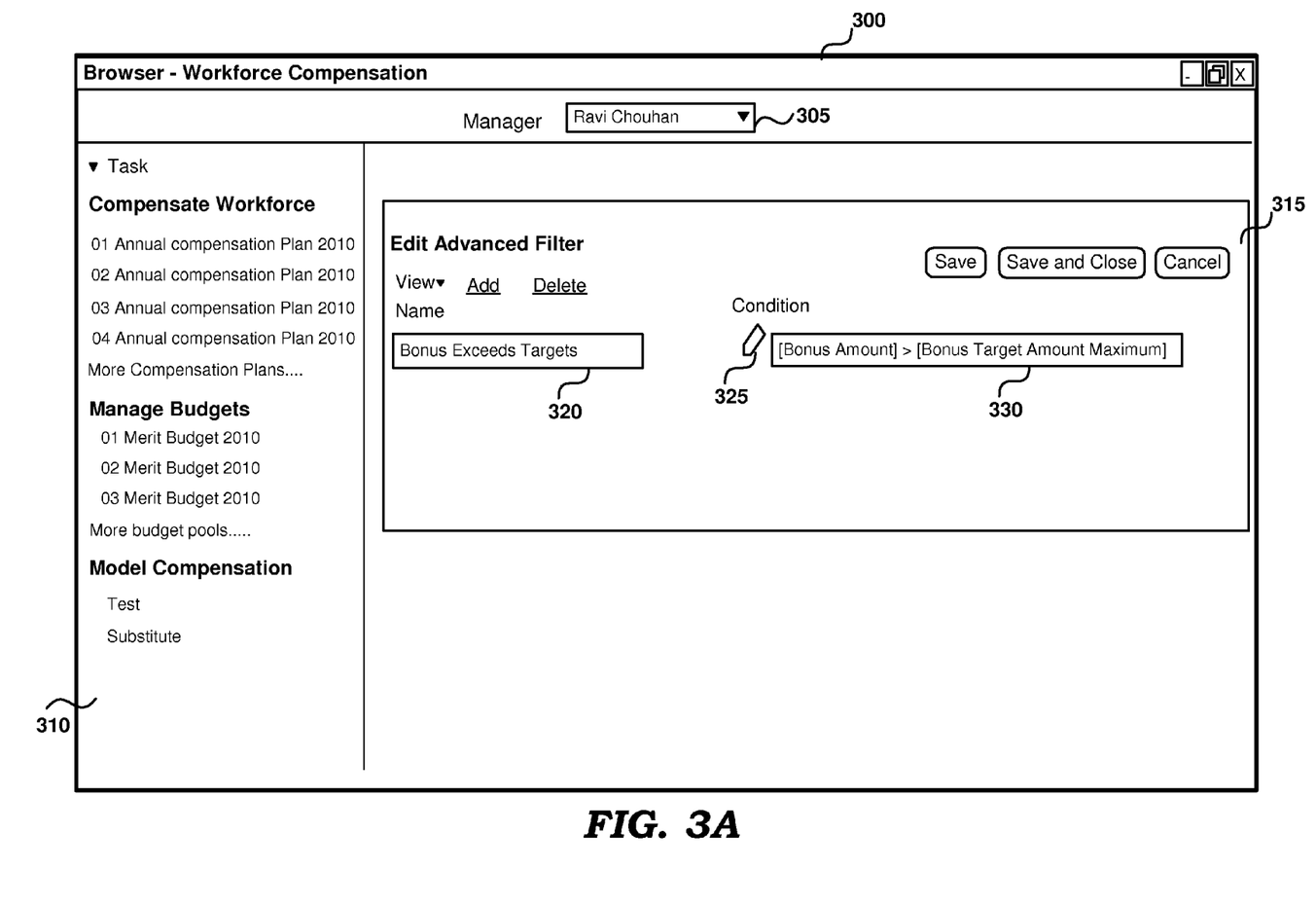
FIGS. 3A-3C together depicts the manner in which a user/manager is enabled to create a custom filter of interest in one embodiment.
Figure 3B:
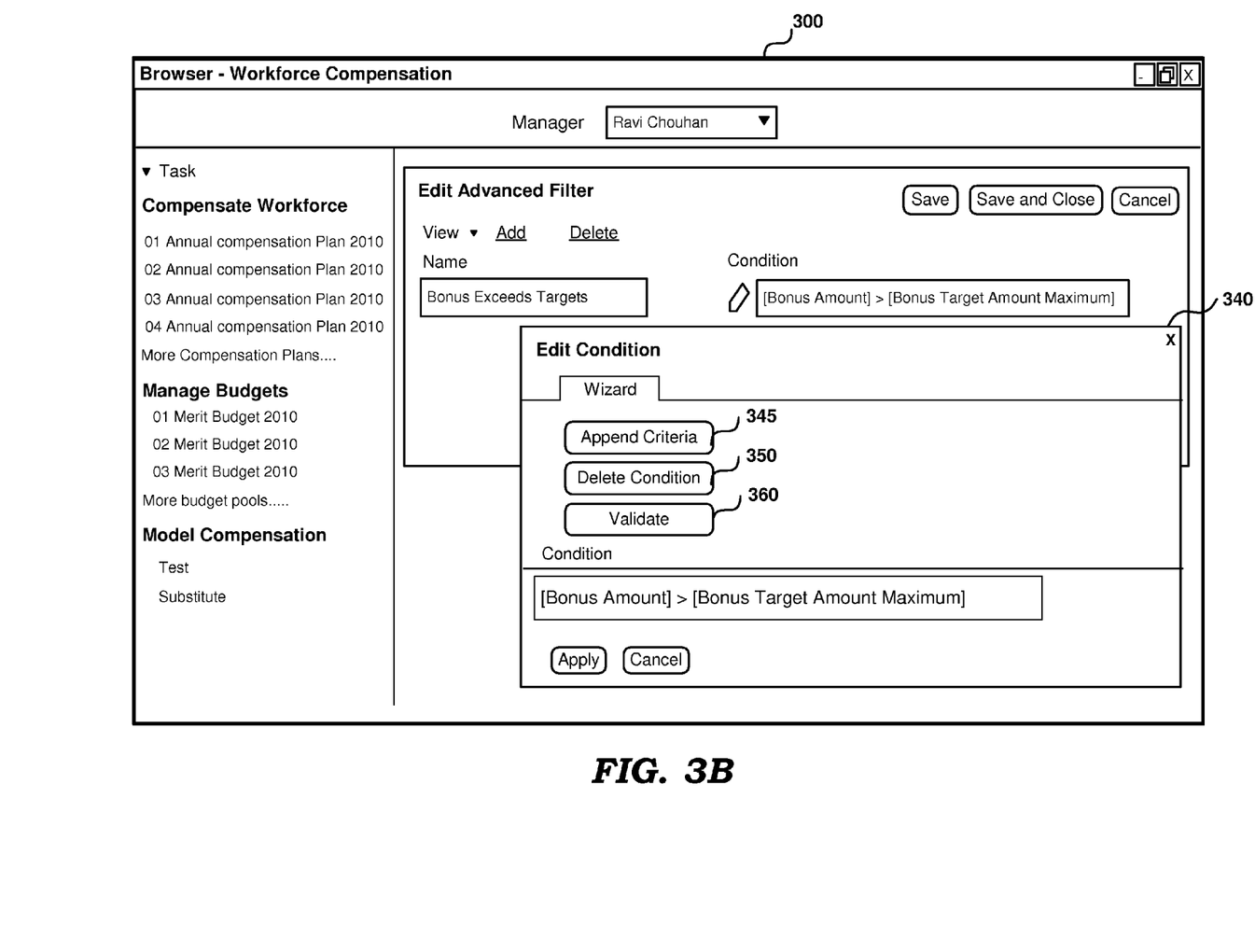
Figure 3C:
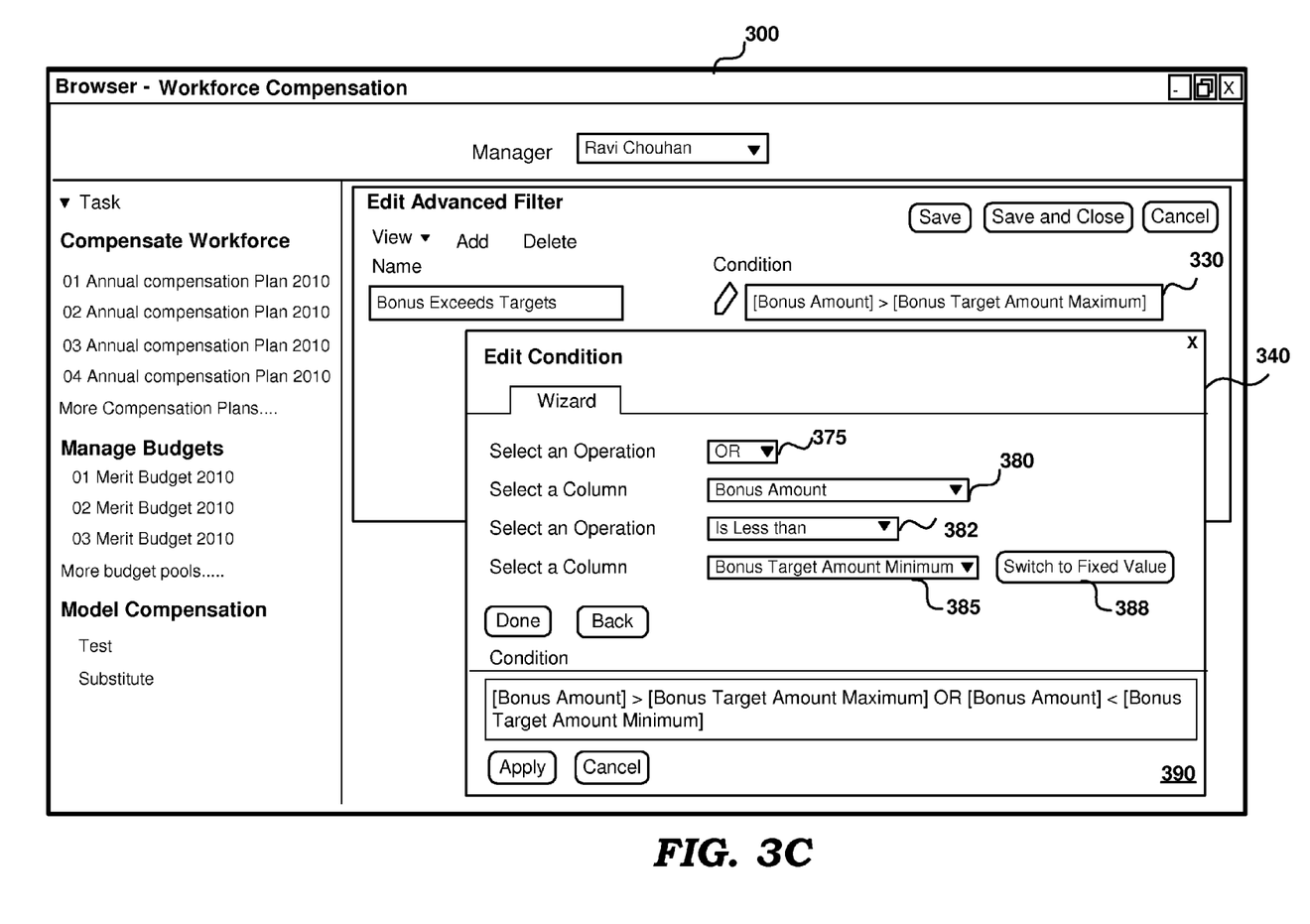

FIGS. 3A-3C together depicts the manner in which a user/manager is enabled to create a custom filter of interest in one embodiment. Display area 300 of FIGS. 3A-3C (and also display area 400 of FIGS. 4A-4B) depicts a portion of a user interface displayed on a display unit (not shown) associated with a client system (such as 110A). Each user interface is in the form of a web page generated by an enterprise compensation application executing in server 160A, which can be viewed using a web browser executing in the client system. The web pages may be provided in response to corresponding requests sent by a user/manager using the client system, typically after the user/manager has been authenticated (e.g., by providing a user name and password)

Display area 300 depicts a user interface provided in response to user/manager sending a request to edit a custom filter. Field 305 indicates the name "Ravi Chouhan" of the manager who has been authenticated and is currently allocating compensation to various employees (that the manager is responsible for). Display area 310 provides a list of tasks that the authenticated manager is allowed to perform, such as allocate compensation to various employees (shown as plans under the heading "Compensate Workforce"), manage the budgets, model compensation, etc.

Display area 315 enables a manager to edit an advanced/custom filter that the manager had previously created. In particular, display area 315 depicts a previously created custom filter named "Bonus Exceeds Targets" (as indicated by text field 320) and a corresponding condition "[Bonus Amount]>[Bonus Target Amount Maximum]" (as indicated by text field 330), wherein the [Bonus Amount] and [Bonus Target Amount Maximum] represents pre-defined data fields in the employee information. It may be appreciated that the user/manager may specify any desired text (logical or understandable name) in text field 320, i.e., for each of the custom filters.

The manager may click on the "Add" or "Delete" links to add/remove conditions from the custom filter. The manager may also click on icon 325 to edit the corresponding condition shown in text field 330.

Referring to FIG. 3B, display area 340 represents a pop-up window shown in response to a user/manager clicking icon 325 for editing the condition shown in text field 330. The manager may select a desired one of "Append Criteria" button 345, "Delete Condition" button 350 or "Validate" button 360 to respectively add new criteria to the condition, delete the condition as a whole or validate the condition. As is well known, validation refers to checking of syntactic/semantic validity of the condition. For example, conditions of the form "{COL1} is null and {COL1} is not null", "{COL1}>3 and {COL1}<3", where {COL1} is a column/pre-defined data field such as [Bonus Amount] may be indicated to be invalid, since no data values of the {COL1} data field will satisfy the conditions.

In one embodiment, in response to a user selecting a specific column in select field 380, only the corresponding columns relevant (for example, of the same data type) to the selected column is shown in select field 385, thereby ensuring that the user constructs only syntactically valid conditions. For example, in response to a user selecting the [Bonus Amount] data field (of the data type Number) in column 380, data fields such as [Date of Joining] (of the data type Date) are not shown in select field 385. The user accordingly cannot specify the syntactically invalid condition [Bonus Amount]>[Date of Joining]. The conditions that have valid syntax/semantics may be indicated to be valid, in response to the user selecting button 360.

Referring to FIG. 3C, display area 340 there depicts a user interface displayed in response to the user/manager selecting "Append Criteria" button 345 for adding a new criteria to the condition. The manager may select the desired logical operator (such as "AND", "OR", "AND NOT", etc.) in select field 375, a desired first column/data field of the employee information (such as "Bones Amount", "Amount last update date", etc.) in select field 380, the desired conditional operation to be checked (such as "Is blank", "Is greater than", etc.) in select field 382, and a corresponding second column/data field in selected field 385. Thus, display area 340 indicates that the user has selected the condition "[Bonus Amount]<[Bonus Target Amount Minimum]" to be applied using the "OR" operator with the previous condition specified in text field 330. The user/manager may also click on "Switch to Fixed Value" button 388 to cause select field 385 to be replaced with a text field, where the user may then specify a fixed value (for example, "1000") as part of the condition.

Thus, a manager may create and/or edit a desired set of custom filters. As noted above, data indicating the customer filters created by each manager may be maintained in data store 180. The manner in which such custom filters are used for limiting the number of employees/employee information presented to the manager is described below with examples.

5. Presenting Employee Information

Figure 4B:
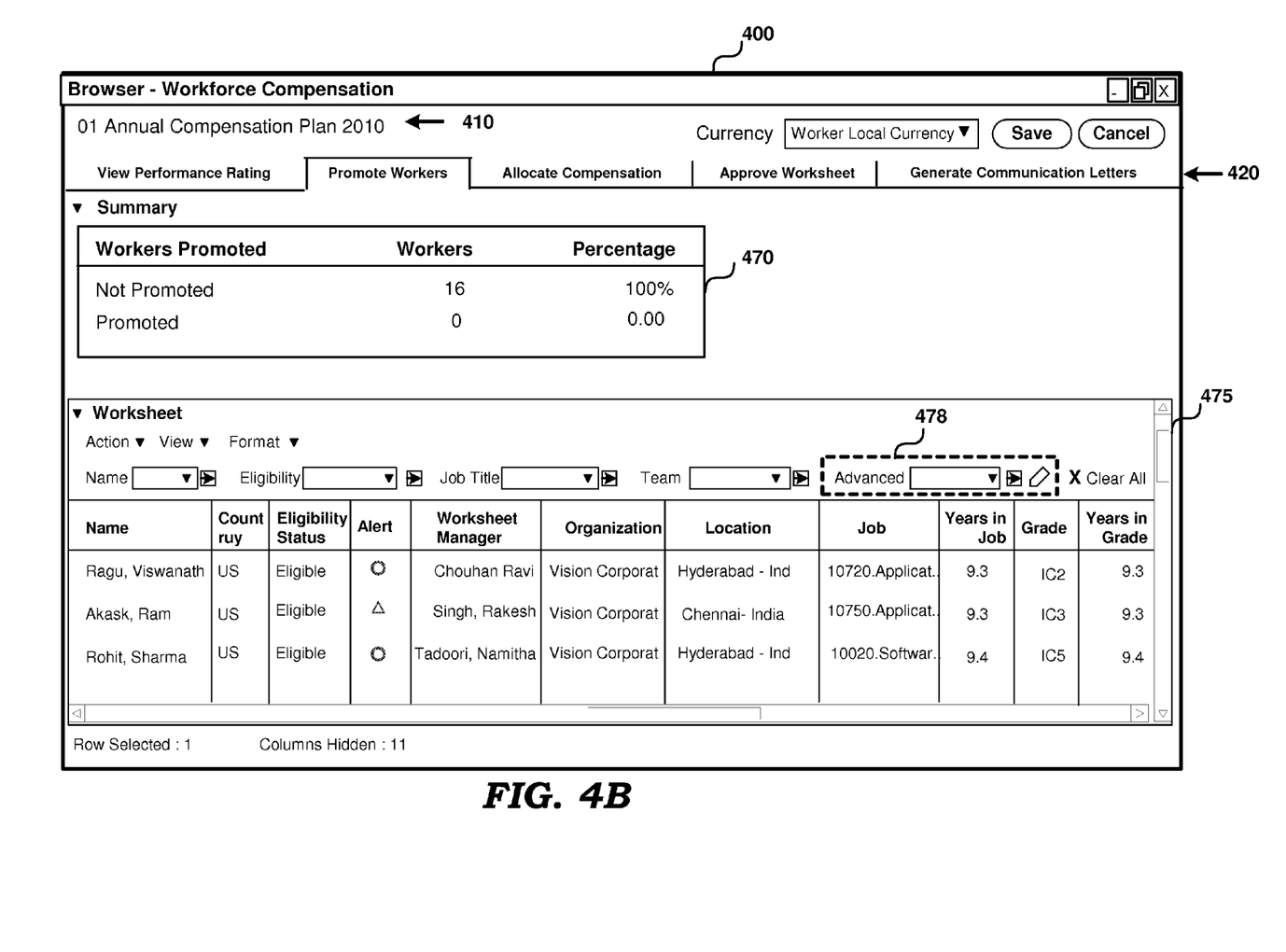
Figure 4C:
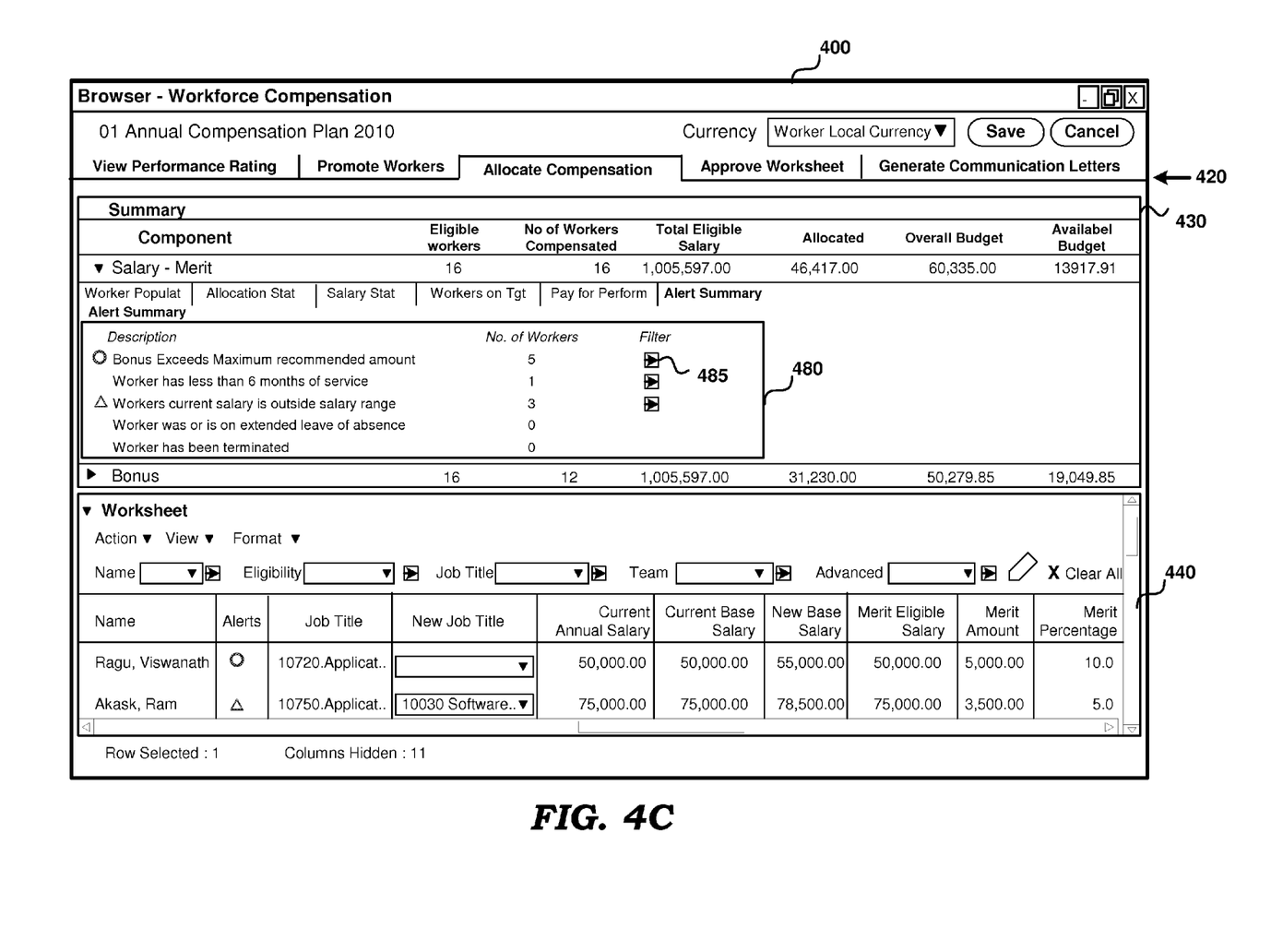

FIGS. 4A-4C together depicts the manner in which employee information is presented to users/managers in one embodiment. Display area 400 depicts a user interface provided in response to a user/manager sending a request to perform compensation allocation. The request may be generated when the user/manager selects one of the compensation plans listed under the heading "Compensate Workforce" in display area 310. The description is continued assuming that the manager has selected "01 Annual Compensation Plan 2010" in display area 310 (as indicated by text 410).

Referring to FIG. 4A, tabs 420 enable the manager to select the specific action ("View Performance Ratings", "Promote Workers", "Allocation Compensation", "Approve Worksheets" and "Generate Communication Letters") to be performed as part of workforce compensation. Each of the tabs displays information related to a list of employees the manager is responsible for, thereby enabling the manager to perform various compensation aspects such as view, promote, and/or allocate compensation to the desired/appropriate employees. Tab "Allocate Compensation" is shown selected to indicate that the manager is currently performing the compensation aspect of allocating compensation for each of his/her responsible employees.

In one embodiment, a user/manager creates a different worksheets in the different tabs, for example, a first worksheet in the "Promote Workers" tab and a second worksheet in the "Allocate Compensation" tab. Each of the worksheets contains a corresponding set of employees, with some of the employees in the set either promoted or allocated compensation by the user/manager. The worksheets are then provided in the "Approve Worksheets" tab to enable the same/different user/manager to approve the created worksheets.

Display area 430 (heading "Summary") provides a summary of the employee information, for example, the number of workers/employees eligible for compensation, the number of workers compensated, etc. Display area 440 (heading "Worksheet") displays the employee information in the form of a table containing rows and columns. Each row provides the information for a corresponding single employee/worker, while each column represents a corresponding data field for each of the employees. Some of the columns such as "Name", "Job Title", "Current Base Salary", etc. may merely display information, while other columns such as "New Job Title", "Merit Amount", etc. may contain select/text fields than enable the manager to allocate/reward (monetary, promotional, etc.) compensation for each employee. Each of the other tabs also displays similar summarized information on top and a corresponding worksheet at the bottom.

Only a representative number of rows and/or columns are shown in display area 440 of FIG. 4A for conciseness. It should be appreciated that other columns may also be provided as part of the employee information in the same or other tabs. Examples of other columns that may be provided are Component, Currency/Units, Eligible Workers, Number of Workers Compensated, Total Eligible Salary, Allocated, Target Amount, Target Maximum, Overall Budget, Overall Budget Percentage, Available Budget, Average % of Eligible Salary, Percentage Compensated, Target Minimum, etc. In one embodiment, each user/manager is enabled to choose the desired columns/data fields to be displayed in the worksheet of each tab.

Display area 445 enables a manager to use generic filters for limiting the employee information based on various data fields such as name, eligibility, job title, team, etc. However, such simple (generic) filters may not be adequate when compensation needs to be allocated for a large number of employees.

Display area 450, provided according to an aspect of the present invention, makes available a list of custom filters that were previously created by the manager (currently performing the allocation of compensation). Each of the custom filters may have been specifically created by the manager to reduce the number of employees/amount of employee information presented when the custom filter is applied to the requested employee information shown in display area 440 (and also in display area 430 as described below).

Thus, the manager may select the desired one of the custom filters shown in the select field in display area 450 and click on the arrow button 455 to cause only a subset of workers/employees matching the condition(s) specified in the selected custom filter to be presented in display area 440. In one embodiment, the selection of arrow button 455 causes a request to be sent to the enterprise compensation application executing in server system 160A, with the application then determining the subset of employees/workers based on the selected filter and presenting (in the form of a web page) the determined subset of employees. The manager may also click on "Clear All" link 465 to remove all the filters applied to the employee information, thereby causing the worksheet to display the original employee information (before any of the filters was applied).

The determination of the subset of employees is performed based on the conditions specified in the selected custom filter. If a custom filter specifies a condition based on a first data field (e.g., "[Country]='US'"), only employees whose first data field (values) satisfy the condition are included in the subset of employees. Thus, assuming that an enterprise has 500 US employees and 2000 Indian employees, the information on the total of 2500 employees may be initially displayed. On application of the custom filter, only the 500 US employees are determined as matching the condition and are therefore included in the subset. The information on determined subset (500) of employees may then be displayed in display area 440, thereby simplifying the compensation management.

It may be appreciated that a user/manager may specify more complex custom filters (having multiple conditions, more number of data fields, etc.). An example of such a complex custom filter is "[Country]='US' AND [Comparatio]<80 AND [Performance Rating]>=4", where [Country], [Comparatio] and [Performance Rating] are data fields in the employee information. Accordingly, only the employees whose data fields (values) satisfies some or all (based on whether logical operation "OR" or "AND" is specified) of the multiple conditions are included in the determined subset.

Furthermore, assuming that a first subset of employees are presented (in display area 440) based on application of a first filter (selected in display area 450), the first set of filters may be again made available to the first user to enable the user to further select and apply any of the other filters on the presented first subset. In other words, the further selected filters are applied on the results of application of the first filter. Thus, the manager may repeatedly select the same/different filters to be applied to the results of the previous application, thereby enabling the manager to view only the information related to the desired set of employees. The manager may also select "Clear All" link 465 to remove all the applied filters. The manager may also select icon 460 to edit a selected advanced filter (using the interface shown in FIGS. 3A-3C), for example, to further customize the filter in view of the subset of employees presented by the initial selection of the filter.

According to an aspect of the present invention, the selected filter and the result of application of the selected filter is persisted across the various tabs. In other words, once a custom filter is selected in any of the tabs, the same selected filter is applied to limit the employee information shown in the various tabs. Thus, a manager may create a filter such as "[Bonus Amount]>[Bonus Target Amount Maximum]" and select the filter in display area 450 for applying the created filter to the set of employees displayed in the "Allocate Compensation" tab (shown in FIG. 4A). The employees matching the filter may accordingly be displayed in display area 440. In the scenario that the manager then selects any of the other tabs such as "Promote Workers" or "View Performance Ratings", the same selected custom filter will be applied in the selected tab.

Referring to FIG. 4B, display area 470 (Summary) and 475 (Worksheet) are displayed in response to a user selecting the "Promote Workers" tab in tabs 620. Display area 475 displays a specific set of employees if the manager selected the "Promote Workers" tab before selection of a custom filter, and a subset of the specific set of employees if the tab is selected after selection of the customer filter. The subset of the specific set of employees is determined based on the conditions specified in the selected custom filter. Display area 470, similarly displays the summary information of the specific set of employees or the subset of the specific set based on whether the "Promote Workers" tab is selected before or after the selection of the custom filter. The selected custom filter (in display area 450 of FIG. 4A) may also be displayed in display area 478. The customer filter may similarly be applied to the employees displayed in the other tabs such as "View Performance Ratings" tab.

Thus, a selected filter is applied/persisted across the different tabs, thereby avoiding lot of re-work for managers when accessing employee information in the different tabs. A manager may click on any of the "Clear All" links (such as 465 of FIG. 4A or that shown in FIG. 4B) to remove all the filters applied to the employee information across all the tabs.

Referring back to FIG. 4A, an aspect of the present invention provides for custom filters to be shown in display area 450 only if the corresponding columns specified in the conditions of the custom filters are currently being displayed (made visible) to the user/manager. Thus, when the manger indicates that some of the columns are to be hidden (not made visible) as indicated by text 468, the custom filters whose conditions are based on such hidden columns are not included in the identified set/shown in display area 450. Such a feature enables the manager to view only the custom filters that are relevant to the employee information being currently viewed.

It may be appreciated that the data values shown in display area 430 (summary) may also be updated based on the custom filter selected by the manger. Thus, when a manager selects a custom filter to be applied, both of display areas 430 and 440 may be updated based on the subset of employees determined by the application of the selected custom filters. The summary may also indicate the number of employees satisfying each custom filter (prior to actual application), as described below with examples.

Referring to FIG. 4C, display area 480 (shown under the summary section) indicates a set of custom filters created by the manger, the corresponding number of workers/employees matching the custom filter, and an arrow button associated with each custom filter for applying the corresponding filter. The manager may click on the desired arrow button to apply the corresponding custom filter on the employee information shown in display area 440.

It may be appreciated that the custom filters can be made available to the user in any convenient manner. For example, the various filters may be provided as part of a context menu (displayed when a user presses "Right Click" on a mouse device), in addition to the select field shown in display area 450. A user may then select and apply the desired custom filter from either display area 450 or from the context menu. It may be appreciated that the feature of displaying the number of employees satisfying each custom filter (prior to actual application) may be provided in the summary display areas of other tabs (such as display area 470 of "Promote Workers" tab shown in FIG. 4B) as well.

It should be further appreciated that the features described above can be implemented in various embodiments as a desired combination of one or more of hardware, executable modules, and firmware. The description is continued with respect to an embodiment in which various features are operative when the software instructions described above are executed.

6. Digital Processing System

Figure 5:
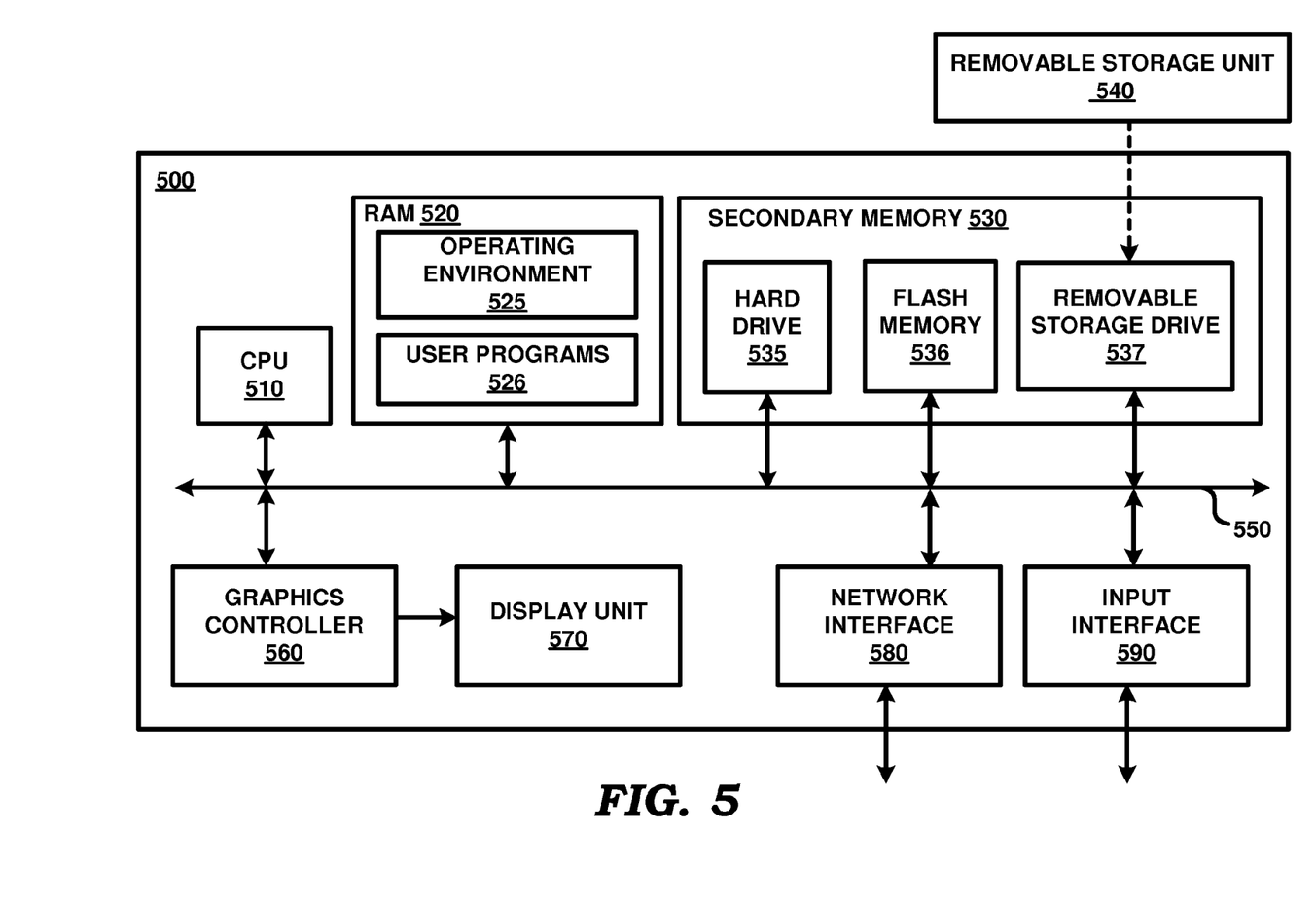
FIG. 5 is a block diagram illustrating the details of a digital processing system in which several aspects of the present invention are operative by execution of appropriate executable modules.

FIG. 5 is a block diagram illustrating the details of digital processing system 500 in which various aspects of the present invention are operative by execution of appropriate executable modules. Digital processing system 500 may correspond to any system (such as server system 160A) executing the enterprise compensation application or the client system (110A-110C) providing the corresponding user interface.

Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting shared environment 525 and/or user programs 526 (such as networking applications, database applications, etc.). Shared environment 525 contains utilities shared by user programs, and such shared utilities include operating system, device drivers, virtual machines, flow engine, etc., which provide a (common) run time environment for execution of user programs/applications.

Graphics controller 560 generates display signals (e.g., in RGB format) to display unit 570 based on data/instructions received from CPU 510. Display unit 570 contains a display screen to display the images defined by the display signals (such as the user interfaces shown in FIGS. 3A-3C and 4A-4B). Input interface 590 may correspond to a keyboard and a pointing device (e.g., touch-pad, mouse) and may be used to provide the user inputs required for several aspects of the present invention (such as those provided for interacting with the user interfaces shown in FIGS. 3A-3C and 4A-4B). Network interface 580 provides connectivity to a network (e.g., using Internet Protocol), and may be used to communicate with other connected systems (such as client systems 110A-110C, data store 180, etc.) of FIG. 1.

Secondary memory 530 (representing a non-transitory storage/medium) may contain hard drive 535, flash memory 536, and removable storage drive 537. Secondary memory 530 may store the data (for example, data indicating the custom filters created by each user) and software instructions (for example, for performing the steps of FIG. 2), which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of facilitating management of compensation for a large number of employees, said method being implemented by an enterprise compensation application executing on a set of server systems, said method comprising:

enabling different users to create corresponding sets of custom filters of interest, wherein a first user is enabled to create a first set of custom filters and a second user is enabled to create a second set of custom filters, said second set of filters being different from said first set of filters;

storing in a non-volatile storage, data indicating the corresponding set of custom filters created by each user, including said first set of custom filters associated with said first user and said second set of custom filters associated with said second user;

receiving a request from a user to apply a first compensation plan;

presenting first information related to a first set of employees on a display unit indicating that said user is responsible for specifying compensation for said first set of employees under said first compensation plan, wherein said first information contains, for each of said first set of employees, respective values for a set of data fields;

identifying a set of custom filters created by said user by examining the data in said non-volatile storage, wherein said first set of custom filters is identified as said set of custom filters if said user is said first user, and said second set of custom filters is identified as said set of custom filters if said user is said second user;

making available said set of custom filters on said display unit to said user, wherein said identifying, said presenting and said making are performed in response to receiving of said request, wherein said set of custom filters is made available to said user after said presenting of said information related to said first set of employees on said display unit;

receiving an input indicating that said user has selected a first custom filter from said set of custom filters displayed on said display unit;

determining a subset of said first set of employees, as limited by said first custom filter; and presenting second information related to said subset of said first set of employees on said display unit to said user to thereby facilitate said user to manage the compensation of said subset in accordance with said first compensation plan, wherein said second information contains, for each of said subset of said first set of employees, said respective values for said set of data fields, wherein said determining and said presenting are performed in response to said receiving of said input.

2. The method of claim 1, wherein information related to employees comprises a plurality of data fields including said set of data fields, wherein said first custom filter specifies a first condition based on a first data field of said plurality of data fields, wherein said determining includes a first employee in said subset only if said first data field for said first employee satisfies said first condition.

3. The method of claim 2, wherein said presenting presents said first information related to said first set of employees in the form of a first tab of an ordered set of tabs on said display unit, wherein said input indicating selection of said first custom filter is received in said first tab, wherein each tab of said ordered set of tabs is used for performing a corresponding action of a sequence of actions related to managing compensation, wherein navigation to each of said ordered set of tabs causes presentation of a corresponding some or all of said first set of employees, said method further comprising:

receiving an indication that said user has navigated to a second tab of said ordered set of tabs from said first tab;

presenting in said second tab a second set of employees, wherein said second set of employees equals a second subset of said first set of employees if said indication is received before said input and equals a third subset of said first set of employees if said indication is received after said input, wherein said third subset is formed by limiting said second subset of employees based on said first custom filter indicated by said user in said first tab.

4. The method of claim 3, wherein said ordered set of tabs further comprise an approve tab, wherein a user creates a first worksheet in said first tab, wherein said user specifies a first compensation aspect of a first specific set of employees contained in said first of employees, wherein said user creates a second worksheet in said second tab, wherein said user specifies a second compensation aspect of a second specific set of employees contained in said first of employees, and wherein said user is enabled to approve said first work sheet and said second worksheet in said approve tab, wherein specifying said first compensation aspect, specifying said second compensation aspect and said approving are respective actions of said sequence of actions.

5. The method of claim 4, wherein said first tab is a promote tab and said second tab is an allocate compensation tab, whereby said user indicates a corresponding promotion for each of said first specific set of employees in said first tab, and specifies a corresponding compensation for each of said second specific set of employees in said second tab.

6. The method of claim 3, further comprising receiving a second input from said user in said first tab, said second input indicating that said first custom filter is to be cleared, wherein said presenting presents in said first tab, said first information related to said first set of employees in response to said second input, and presents in said second tab, said second subset of said first set of employees if said indication is received after said second input.

7. The method of claim 2, wherein said plurality of data fields are presented as corresponding columns, wherein said first data field specified in said first custom filter is presented as a first column, said method further comprising:

receiving a hide request from said user indicating that said first column is to be hidden; and in response to said hide request, not including any custom filter specifying said first data field in said set of filters made available to said user, wherein a subset of custom filters, each specifying said first data field, are included in said set of filters prior to receiving of said hide request, whereby said first custom filter is not included in said set of filters made available to said user in response to said hide request.

8. The method of claim 1, wherein said first set of custom filters contains a second custom filter that is not contained in said second set of custom filters, wherein said second custom filter is made available if said user is said first user and is not made available if said user is said second user.

9. A non-transitory machine readable medium storing one or more sequences of instructions for causing a system to facilitate management of compensation for a large number of employees, wherein execution of said one or more sequences of instructions by one or more processors contained in said system causes said system to perform the actions of:

enabling different users to create corresponding sets of custom filters of interest, wherein a first user is enabled to create a first set of custom filters and a second user is enabled to create a second set of custom filters, said second set of filters being different from said first set of filters;

storing in a non-volatile storage, data indicating the corresponding set of custom filters created by each user, including said first set of custom filters associated with said first user and said second set of custom filters associated with said second user;

receiving a request from a user to apply a first compensation plan;

presenting first information related to a first set of employees on a display unit indicating that said user is responsible for specifying compensation for said first set of employees under said first compensation plan, wherein said first information contains, for each of said first set of employees, respective values for a set of data fields;

identifying a set of custom filters created by said user by examining the data in said non-volatile storage, wherein said first set of custom filters is identified as said set of custom filters if said user is said first user, and said second set of custom filters is identified as said set of custom filters if said user is said second user;

making available said set of custom filters on said display unit to said user, wherein said identifying, said presenting and said making are performed in response to receiving of said request, wherein said set of custom filters is made available to said user after said presenting of said information related to said first set of employees on said display unit;

receiving an input indicating that said user has selected a first custom filter from said set of custom filters displayed on said display unit;

determining a subset of said first set of employees, as limited by said first custom filter; and presenting second information related to said subset of said first set of employees on said display unit to said user to thereby facilitate said user to manage the compensation of said subset in accordance with said first compensation plan, wherein said second information contains, for each of said subset of said first set of employees, said respective values for said set of data fields, wherein said determining and said presenting are performed in response to said receiving of said input.

10. The machine readable medium of claim 9, wherein information related to employees comprises a plurality of data fields including said set of data fields, wherein said first custom filter specifies a first condition based on a first data field of said plurality of data fields, wherein said determining includes a first employee in said subset only if said first data field for said first employee satisfies said first condition.

11. The machine readable medium of claim 10, wherein said presenting presents said first information related to said first set of employees in the form of a first tab of an ordered set of tabs on said display unit, wherein said input indicating selection of said first custom filter is received in said first tab, wherein each tab of said ordered set of tabs is used for performing a corresponding action of a sequence of actions related to managing compensation, wherein navigation to each of said ordered set of tabs causes presentation of a corresponding some or all of said first set of employees, said machine readable medium further comprising one or more instructions for:

receiving an indication that said user has navigated to a second tab of said ordered set of tabs from said first tab;

presenting in said second tab a second set of employees, wherein said second set of employees equals a second subset of said first set of employees if said indication is received before said input and equals a third subset of said first set of employees if said indication is received after said input, wherein said third subset is formed by limiting said second subset of employees based on said first custom filter indicated by said user in said first tab.

12. The machine readable medium of claim 11, wherein said ordered set of tabs further comprise an approve tab, wherein a user creates a first worksheet in said first tab, wherein said user specifies a first compensation aspect of a first specific set of employees contained in said first of employees, wherein said user creates a second worksheet in said second tab, wherein said user specifies a second compensation aspect of a second specific set of employees contained in said first of employees, and wherein said user is enabled to approve said first work sheet and said second worksheet in said approve tab, wherein specifying said first compensation aspect, specifying said second compensation aspect and said approving are respective actions of said sequence of actions.

13. The machine readable medium of claim 11, further comprising one or more instructions for receiving a second input from said user in said first tab, said second input indicating that said first custom filter is to be cleared, wherein said presenting presents in said first tab, said first information related to said first set of employees in response to said second input, and presents in said second tab, said second subset of said first set of employees if said indication is received after said second input.

14. The machine readable medium of claim 10, wherein said plurality of data fields are presented as corresponding columns, wherein said first data field specified in said first custom filter is presented as a first column, further comprising one or more instructions for:

receiving a hide request from said user indicating that said first column is to be hidden; and in response to said hide request, not including any custom filter specifying said first data field in said set of filters made available to said user, wherein a subset of custom filters, each specifying said first data field, are included in said set of filters prior to receiving of said hide request, whereby said first custom filter is not included in said set of filters made available to said user in response to said hide request.

15. The machine readable medium of claim 9, wherein said first set of custom filters contains a second custom filter that is not contained in said second set of custom filters, wherein said second custom filter is made available if said user is said first user and is not made available if said user is said second user.

16. A digital processing system facilitating management of compensation for a large number of employees, said digital processing system comprising a set of server system implementing an enterprise compensation application executing on a set of server systems, said digital processing system comprising:

a memory to store instructions; and one or more processors to retrieve and execute said instructions stored in said memory, wherein execution of said instructions causes said digital processing system to perform the actions of:

enabling different users to create corresponding sets of custom filters of interest, wherein a first user is enabled to create a first set of custom filters and a second user is enabled to create a second set of custom filters, said second set of filters being different from said first set of filters;

storing in a non-volatile storage, data indicating the corresponding set of custom filters created by each user, including said first set of custom filters associated with said first user and said second set of custom filters associated with said second user;

receiving a request from a user to apply a first compensation plan;

presenting first information related to a first set of employees on a display unit indicating that said user is responsible for specifying compensation for said first set of employees under said first compensation plan, wherein said first information contains, for each of said first set of employees, respective values for a set of data fields;

identifying a set of custom filters created by said user by examining the data in said non-volatile storage, wherein said first set of custom filters is identified as said set of custom filters if said user is said first user, and said second set of custom filters is identified as said set of custom filters if said user is said second user;

making available said set of custom filters on said display unit to said user, wherein said identifying, said presenting and said making are performed in response to receiving of said request, wherein said set of custom filters is made available to said user after said presenting of said information related to said first set of employees on said display unit;

receiving an input indicating that said user has selected a first custom filter from said set of custom filters displayed on said display unit;

determining a subset of said first set of employees, as limited by said first custom filter; and presenting second information related to said subset of said first set of employees on said display unit to said user to thereby facilitate said user to manage the compensation of said subset in accordance with said first compensation plan, wherein said second information contains, for each of said subset of said first set of employees, said respective values for said set of data fields, wherein said determining and said presenting are performed in response to said receiving of said input.

17. The digital processing system of claim 16, wherein information related to employees comprises a plurality of data fields including said set of data fields, wherein said first custom filter specifies a first condition based on a first data field of said plurality of data fields, wherein said determining includes a first employee in said subset only if said first data field for said first employee satisfies said first condition.

18. The digital processing system of claim 17, wherein said presenting presents said first information related to said first set of employees in the form of a first tab of an ordered set of tabs on said display unit, wherein said input indicating selection of said first custom filter is received in said first tab, wherein each tab of said ordered set of tabs is used for performing a corresponding action of a sequence of actions related to managing compensation, wherein navigation to each of said ordered set of tabs causes presentation of a corresponding some or all of said first set of employees, said actions further comprising:

receiving an indication that said user has navigated to a second tab of said ordered set of tabs from said first tab;

presenting in said second tab a second set of employees, wherein said second set of employees equals a second subset of said first set of employees if said indication is received before said input and equals a third subset of said first set of employees if said indication is received after said input, wherein said third subset is formed by limiting said second subset of employees based on said first custom filter indicated by said user in said first tab.

19. The digital processing system of claim 18, wherein said ordered set of tabs further comprise an approve tab, wherein a user creates a first worksheet in said first tab, wherein said user specifies a first compensation aspect of a first specific set of employees contained in said first of employees, wherein said user creates a second worksheet in said second tab, wherein said user specifies a second compensation aspect of a second specific set of employees contained in said first of employees, and wherein said user is enabled to approve said first work sheet and said second worksheet in said approve tab, wherein specifying said first compensation aspect, specifying said second compensation aspect and said approving are respective actions of said sequence of actions, wherein said first tab is a promote tab and said second tab is an allocate compensation tab, whereby said user indicates a corresponding promotion for each of said first specific set of employees in said first tab, and specifies a corresponding compensation for each of said second specific set of employees in said second tab.

20. The digital processing system of claim 16, wherein said first set of custom filters contains a second custom filter that is not contained in said second set of custom filters, wherein said second custom filter is made available if said user is said first user and is not made available if said user is said second user.

* * * * *

UNITED STATES PATENT AND TRADEMARK OFFICE
CERTIFICATE OF CORRECTION

PATENT NO. : 10,366,350 B2
APPLICATION NO. : 13/095931
DATED : July 30, 2019
INVENTOR(S) : Upadhyaya et al.

Page 1 of 1

It is certified that error appears in the above-identified patent and that said Letters Patent is hereby corrected as shown below:

In the Specification

In Column 5, Line 23, delete "differet" and insert -- different --, therefor.

In Column 6, Line 12, after "password)" insert -- . --.

Signed and Sealed this
Twenty-eighth Day of July, 2020

Andrei Iancu
*Director of the United States Patent and Trademark Office*